United States Patent
Lie et al.

(10) Patent No.: US 11,549,366 B1
(45) Date of Patent: Jan. 10, 2023

(54) ELECTROMAGNETIC TELEMETRY SYSTEMS, METHODS TO OBTAIN DOWNHOLE SIGNALS INDICATIVE OF A DRILLING OPERATION, AND DRILLING DATA ACQUISITION SYSTEMS

(71) Applicant: Halliburton Energy Services, Inc., Houston, TX (US)

(72) Inventors: Joni Polili Lie, The Woodlands, TX (US); Matthew Hui Chong, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/403,717

(22) Filed: Aug. 16, 2021

(51) Int. Cl.
| H04B 17/318 | (2015.01) |
| E21B 47/13 | (2012.01) |
| H04B 17/21 | (2015.01) |
| H04B 17/20 | (2015.01) |

(52) U.S. Cl.
CPC ............. *E21B 47/13* (2020.05); *H04B 17/20* (2015.01); *H04B 17/21* (2015.01); *H04B 17/318* (2015.01)

(58) Field of Classification Search
CPC ......... E21B 47/12; E21B 47/13; H04B 17/20; H04B 17/21; H04B 17/318
See application file for complete search history.

(56) References Cited

U.S. PATENT DOCUMENTS

| 9,638,028 | B2 | 5/2017 | Gao et al. |
| 10,502,860 | B2 | 12/2019 | Jannin et al. |
| 10,968,735 | B2 | 4/2021 | Fan et al. |
| 10,972,124 | B2 | 4/2021 | Hill et al. |
| 2004/0084218 | A1 | 5/2004 | Brune et al. |
| 2017/0335680 | A1* | 11/2017 | Liu ........................ E21B 47/125 |
| 2018/0128097 | A1 | 5/2018 | DePavia et al. |
| 2019/0048713 | A1* | 2/2019 | Derkacz ................... E21B 47/13 |
| 2019/0154859 | A1 | 5/2019 | Song et al. |

FOREIGN PATENT DOCUMENTS

EP  3158166 B1  7/2019

OTHER PUBLICATIONS

International Search Report and Written Opinion dated May 6, 2022 in PCT/US2021/046460 filed on Aug. 18, 2021 (13 pages).

* cited by examiner

*Primary Examiner* — Benyam Haile
(74) *Attorney, Agent, or Firm* — McGuireWoods LLP (57) ABSTRACT

Electromagnetic telemetry systems, methods to obtain downhole signals indicative of a drilling operation, and drilling data acquisition systems are presented. An electromagnetic telemetry system includes a downhole transmitter configured to transmit signals indicative of whether the downhole transmitter is in a transmission mode to transmit drilling data, a drilling data acquisition system configured to receive the signals indicative of whether the downhole transmitter is in the transmission mode, and one or more remote nodes disposed around the hydrocarbon wellsite. Each respective remote node of the one or more remote nodes configured to operate in a first mode to periodically transmit data indicative of the signal strength to the drilling data acquisition system. Each respective remote node is also configured to operate in a second mode to acquire drilling data from the downhole transmitter, and wirelessly transmit the drilling data to the drilling data acquisition system.

20 Claims, 8 Drawing Sheets

ELECTROMAGNETIC TELEMETRY SYSTEMS, METHODS TO OBTAIN DOWNHOLE SIGNALS INDICATIVE OF A DRILLING OPERATION, AND DRILLING DATA ACQUISITION SYSTEMS

BACKGROUND

The present disclosure relates generally to electromagnetic telemetry systems, methods to obtain downhole signals indicative of a drilling operation, and drilling data acquisition systems.

Wellbores are sometimes drilled from the surface of a wellsite several hundred to several thousand feet downhole to reach hydrocarbon resources. Data are sometimes transmitted by one or more transmitters positioned on or near a drill bit to provide information regarding the drilling operation, including, but not limited to, the location of the drill, the well path, the presence of nearby hydrocarbon resources, and one or more downhole conditions of the surrounding formation. Data transmitted by the transmitters are sometimes analyzed by a surface-based electronic device to monitor the drilling operation.

However, as a drilling operation continues and the Euclidian distance between the transmitters and the surface-based electronic device increases, some of the data transmitted by the transmitters are lost or are not received by the surface-based electronic device.

BRIEF DESCRIPTION OF THE DRAWINGS

Illustrative embodiments of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to electromagnetic telemetry systems, methods to obtain downhole signals indicative of a drilling operation, and drilling data acquisition systems. The electromagnetic telemetry system includes a downhole transmitter that is configured to engage in electromagnetic telemetry operations to transmit data indicative of a drilling operation (hereafter referred to as "drilling data"). As referred to herein, drilling data include any data indicative of the status of the drilling operation (such as whether drilling has commenced), location of a drill used in the downhole operation, the orientation of the drill, the condition of the drill, the location of a well path formed by the drill, the deviation of the actual well path from an expected well path, one or more downhole conditions (such as, but not limited to, the temperature, pH, humidity, resistivity, conductivity, as well as other quantifiable conditions) of the wellbore and surrounding formation, and other quantifiable data related to the drilling operation. The downhole transmitter is also configured to transmit signals indicative of whether the downhole transmitter is in transmission mode to the drilling data acquisition system. As referred to herein, the downhole transmitter is in transmission mode while transmitting drilling data or if drilling data is available for transmission. Further, signals indicative of whether the downhole transmitter is in transmission mode includes acknowledge signals or other signals indicative that the downhole transmitter is transmitting drilling data or will begin transmitting data within a threshold period of time.

Figure 1:
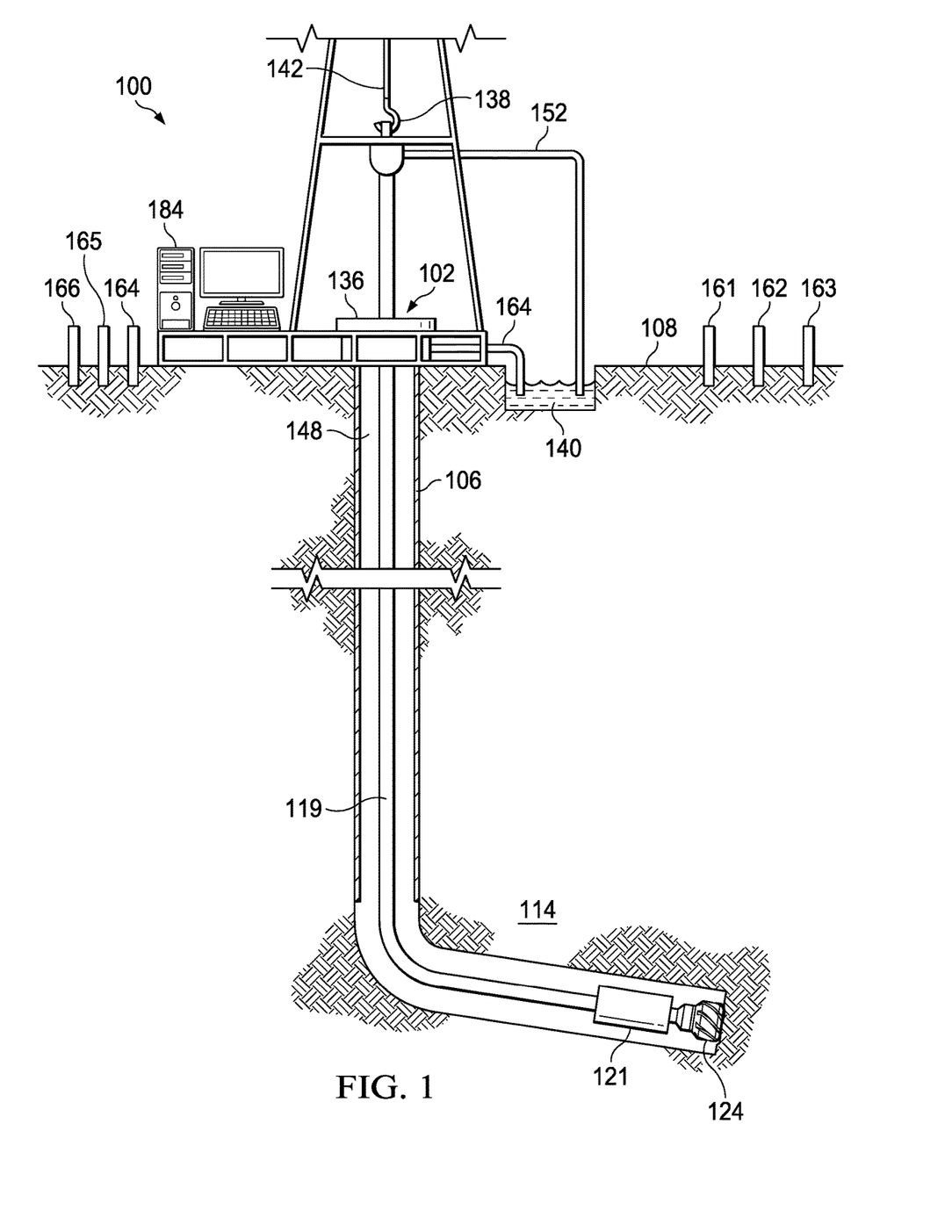
FIG. 1 is a schematic, side view of a drilling environment in which an electromagnetic telemetry system is deployed.

The electromagnetic telemetry system also includes a drilling data acquisition system and one or more remote nodes that are disposed along a wellsite of the drilling operation. As referred to herein, a remote node refers to a node that is remote from or not physically attached to a drilling data acquisition system, where data obtained by the remote node are wirelessly transmitted to the drilling data acquisition system. Further, a remote node refers to any device or component that includes or is communicatively connected to transmitters, receivers, or transceivers configured to periodically transmit data indicative of the signal strength of signals transmitted by the downhole transmitter at the remote node, acquire signals transmitted by the downhole transmitter, and wirelessly transmit the acquired signals to the data drilling analysis system. More particularly, the remote node periodically transmits data indicative of the signal strength of the downhole transmitter at the remote node to the drilling data acquisition system while the remote node operates in survey mode. Further, while the remote node operates in acquisition mode, the remote node acquires signals transmitted by the downhole transmitter, and wirelessly transmits the acquired signals to the drilling data acquisition system. In some embodiments, the remote node also performs one or more processing operations to process the acquired signals before wirelessly transmitting the acquired signals to the drilling data acquisition system. In the embodiment of FIG. 1, six remote nodes are disposed along the wellsite. Further, in the embodiment of FIG. 2, 100 remote nodes are disposed along the wellsite. In other embodiments, a different number of remote nodes are deployed to provide data indicative of the signal strength of the downhole transmitter to the drilling data acquisition, acquire signals transmitted by the downhole transmitter, and wirelessly transmit the acquired signals to the drilling data acquisition system. Additional descriptions of remote nodes are provided in the paragraphs below.

The drilling data acquisition system periodically requests the remote nodes to provide data indicative of the signal strength of signals transmitted by the downhole transmitter and detected at the respective remote nodes. The drilling data acquisition system also periodically receives signals indicative of whether the downhole transmitter is in transmission mode. In some embodiments, after the drilling data acquisition system receives signals indicative that the downhole transmitter is in transmission mode, determines which remote nodes should operate in survey mode and which remote nodes should operate in acquisition mode based on the signal strength of the signals transmitted by the downhole transmitter at the respective remote nodes. For example, the drilling data acquisition system, in response to a determination that the signal strength of the downhole transmitter at a first remote node is greater than a threshold signal strength (e.g., 0.2 volt), requests the first remote node to operate in acquisition mode to acquire signals transmitted by the downhole transmitter, and wirelessly transmit the acquired signals to the drilling data acquisition system. Moreover, the drilling data acquisition system, in response to a determination that the signal strength of the downhole transmitter at the second remote node is not greater than the threshold signal strength, requests the second remote node to operate in survey mode and continue to periodically provide the drilling data acquisition system with data indicative of the signal strength of signals transmitted by the downhole transmitter and detected at the second remote node. In some embodiments, where the drilling data acquisition system determines that the signal strength of signals transmitted by the downhole transmitter is greater than the threshold signal at both the first remote and the second remote node, drilling data acquisition system requests both the first remote node and the second remote node to operate in acquisition mode. In one or more of such embodiments, the drilling data acquisition system is configured to perform operations to combine signals transmitted by the first remote node and the second remote node to improve the quality (e.g., improve the signal strength, improve the signal-to-noise ratio, reduce noise, cancel noise, or improve another quality of the signals) of signals transmitted by the first remote node and the second remote node. In one or more of such embodiments, the drilling data acquisition system is configured to perform operations to reduce or eliminate noise components of signals transmitted by the first remote node and the second remote node. In some embodiments, the drilling data acquisition system also decodes signals transmitted from the remote nodes.

In some embodiments, the drilling data acquisition system determines an expected location (such as along a planned well path or drill path) of the downhole transmitter and requests remote nodes that are directly over, or within a threshold distance from the expected location of the downhole transmitter to operate in acquisition mode. In one or more of such embodiments, the drilling data acquisition system periodically determines the actual location of the downhole transmitter (such as based on the signal strength of signals transmitted by the downhole transmitter at the remote nodes), and in response to a determination that a remote node that is within the threshold distance from the expected location of the downhole transmitter but is not within the threshold distance from the actual location of the downhole transmitter, requests the remote node to operate in survey mode. In one or more of such embodiments, the drilling data acquisition system periodically determines the actual location of the downhole transmitter based on the signal strengths of signals of the downhole transmitter at the remote nodes, and determines an actual well path of a well created during the drilling operation based on the signal strengths of signals of the downhole transmitter at the remote nodes. Additional descriptions of the drilling data acquisition system, downhole transmitter, remote nodes, electromagnetic telemetry system, and methods to obtain downhole signals indicative of a drilling operation are provided in the paragraphs below and are illustrated in at least FIGS. 1-7.

Turning now to the figures, FIG. 1 is a schematic, side view of a drilling environment 100 in which a drilling operation, such as a measuring-while-drilling or a logging-while-drilling operation is performed. In the embodiment of FIG. 1, a well 102 having a wellbore 106 extends from a surface 108 of well 102 to or through a formation 114. A hook 138, cable 142, traveling block (not shown), and hoist (not shown) are provided to lower a conveyance 119 down wellbore 106 of well 102 or to lift conveyance 119 up from wellbore 106 of well 102. In one or more embodiments, conveyance 119 may be a drill string, drill pipe, wireline, slickline, coiled tubing, production tubing, downhole tractor or another type of conveyance operable to be deployed in wellbore 106. At a wellhead 136, an inlet conduit 152 is coupled to a fluid source (not shown) to provide fluids, such as drilling fluids, downhole. In the embodiment of FIG. 1, conveyance 119 has an internal cavity that provides a fluid flow path from surface 108 to a downhole location.

In some embodiments, the fluids travel down conveyance 119 and exit conveyance 119 at a drill bit 124. The fluids flow back toward surface 108 through a wellbore annulus 148 and exit the wellbore annulus 148 via an outlet conduit 164 where the fluids are captured in container 140. During the drilling operation, drilling data, such as whether drilling has commenced, a current location of drill bit 124, the actual well path, an azimuth of well 102, a dip angle of well 102, a frictional force experienced by conveyances and tools used during the drilling operation, the diameter of wellbore 106, the type of lubricity used for the drilling operation, presence of the cuttings bed in wellbore 106, presence of the pack-off, the dogleg in wellbore 106, the keyseat in wellbore 106, the degree of curvature of wellbore 106, the wellbore tortuosity of wellbore 106, the viscous effect of wellbore 106, the diameter of wellbore 106, the asperity between the conveyance used in the drilling operation and wellbore 106, as well as other parameters related to the drilling operation or well 102, and other drilling data are periodically transmitted from a transmitter 121 that is positioned near drill bit 124. Further, signals indicative of whether transmitter 121 is transmitting data (or operating in transmission mode) or not transmitting data are transmitted from transmitter 121 to a drilling data acquisition system 184. In some embodiments, conveyance 119 provides telemetry of data indicative of whether transmitter 121 is in transmission mode to drilling data acquisition system 184.

In some embodiments, signals indicative of whether transmitter 121 is transmitting data are continuously or intermittently transmitted from transmitter 121 to drilling data acquisition system 184 via one or more telemetry techniques including, but not limited to, mud pulse telemetry, acoustic telemetry, and electromagnetic wave telemetry. In one or more embodiments, where a mud-pulse telemetry system is deployed in wellbore 106 to provide telemetry, telemetry information is transmitted by adjusting the timing or frequency of viable pressure pulses in the drilling fluid that is circulated through conveyance 119 during drilling operations. In one or more embodiments, an acoustic telemetry system that transmits data via vibrations in the tubing wall of conveyance 119 is deployed in wellbore 106 to provide telemetry. More particularly, the vibrations are generated by an acoustic transmitter (not shown) mounted on conveyance 119 and propagate along conveyance 119 to an acoustic receiver (not shown) also mounted on conveyance 119. In one or more embodiments, an electromagnetic wave telemetry system that transmits data using current flows induced in conveyance 119 is deployed in wellbore 106 to provide telemetry. Additional types of telemetry systems may also be deployed in wellbore 106 to transmit signals indicative of whether transmitter 121 is transmitting data to drilling data acquisition system 184.

In some embodiments, a surface-based electronic device, such as drilling data acquisition system 184, includes one or more processors configured to receive signals indicative of whether a downhole transmitter such as downhole transmitter 121 is in transmission mode to transmit drilling data of a drilling operation at a hydrocarbon wellbore. The processors are also configured to request remote nodes that are disposed around the hydrocarbon wellsite to transmit data indicative of a signal strength of the downhole transmitter at the one or more remote nodes. In the embodiment of FIG. 1, drilling data acquisition system 184 periodically requests each of remote nodes 161-166 to transmit data indicative of a signal strength of downhole transmitter 121 at the respective remote nodes 161-166 to drilling data acquisition system 184. The processors are further configured to determine at least one remote node (such as remote node 161) having a signal strength that is greater than a threshold value, and request the at least one remote node (such as remote node 161) to wirelessly transmit additional signals acquired from the downhole transmitter. Additional descriptions of drilling data acquisition system 184 and operations performed by the processors of drilling data acquisition system 184 are provided herein and are illustrated in at least FIGS. 6 and 7.

In the embodiment of FIG. 1, six remote nodes 161-166 are positioned along the wellsite. In some embodiments, remote nodes 161-166 are strategically positioned along an expected well path or drill path of a hydrocarbon well. Each remote node 161-166 is wirelessly connected to drilling data acquisition system 184 via a wireless protocol, such as, but not limited to, WiFi, cellular, 3G, 4G, 5G, or another wireless protocol. Further, each remote node 161-166 is configured to operate in survey mode and acquisition mode. While a remote node, such as remote node 161 is operating in survey mode, remote node 161 is configured to periodically transmit data indicative of a signal strength of downhole transmitter 121 at remote node 161 to drilling data acquisition system 184. Further, while remote node 161 is operating in acquisition mode, remote node 161 is configured to acquire the drilling data from downhole transmitter 121, and wirelessly transmit the drilling data acquired from downhole transmitter 121 to drilling data acquisition system 184.

Although FIG. 1 illustrates six remote nodes deployed on surface 108 of the wellsite, in some embodiments, a different number of remote nodes are deployed below surface 108. In some embodiments, where well 102 is a subsea well, remote nodes are deployed on a rig (not shown), on a sea or ocean floor, or below the sea or ocean floor. Additional examples of electromagnetic telemetry systems, methods to obtain downhole signals indicative of a drilling operation, and drilling data acquisition systems are provided in the paragraphs below and are illustrated in at least FIGS. 2-7.

Figure 2:
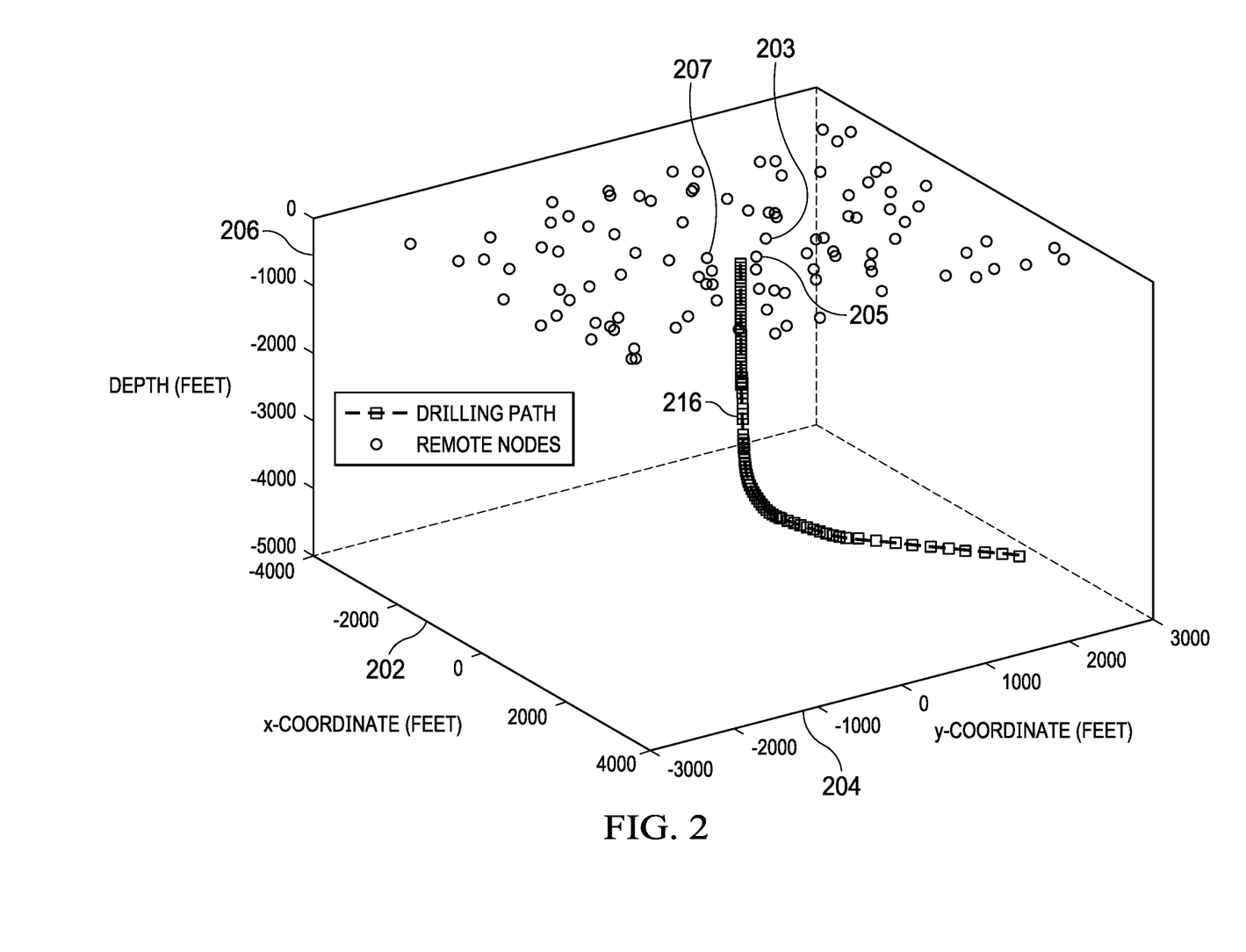
FIG. 2 is a three-dimensional plot of multiple remote nodes that are deployed in a drilling environment similar to the drilling environment of FIG. 1.

FIG. 2 is a three-dimensional plot of multiple remote nodes that are deployed in a drilling environment similar to the drilling environment of FIG. 1. In the embodiment of FIG. 2, axis 202 represents an x-axis, axis 204 represents a y-axis, and axis 206 represents a z-axis of the three-dimensional plot. Further, 100 remote nodes, including remote nodes 203, 205, and 207, each illustrated as a circle, are randomly and spatially spread across a rectangular area of +/−3,000 feet with the center coordinate (0,0) indicating the location of a drilling rig. FIG. 2 also illustrates a well path or a drill path 216 that extends from the surface of the wellsite into the formation. More particularly, well path or drill path 216 has a vertical section of up to 3,000 feet, before steering towards 45-degree azimuth before reaching the bottom at 5,000 feet. In the embodiment of FIG. 2, each of remote nodes are configured to operate in survey mode to calculate the received signal strength at an operating frequency (or frequency range) of electromagnetic telemetry signals transmitted by a downhole transmitter, such as downhole transmitter 121 of FIG. 1. In some embodiments, a remote node is in a sleep mode or a mode that consumes less than a threshold amount of power for a threshold period of time while the remote node is operating in survey mode. In one or more of such embodiments, while the downhole transmitter is not engaged in an electromagnetic telemetry operation to transmit drilling data, the received signal strength information of electromagnetic telemetry signals transmitted by a downhole transmitter captures a noise component that is dominantly generated by surface rig equipment. In one or more of such embodiments, the foregoing noise component is assumed to be static. Moreover, signal strength information of electromagnetic telemetry signals transmitted by a downhole transmitter obtained by the remote nodes, while the downhole transmitter is engaged in an electromagnetic telemetry operation to transmit drilling data, include a signal-plus-noise component used to estimate a signal-to-noise ratio (SNR) at different drilling conditions.

For example, where the noise source to be generated from the surface rig equipment at coordinate (0,0) foot, with noise level at 30 dBm, the noise level at the remote nodes is calculated using equation 1 with the path loss exponent γ set at 7.0:

$$dBm_e = dBm_0 - 10.0\gamma \log_{10}(r/r_0) \qquad \text{Equation 1}$$

where the distance r is the Euclidean distance between the remote node and the noise source while the reference distance $r_0 = 100$ feet is the reference distance where the noise level is measured at 30 dBm. Moreover, the noise level is also weighted by its directivity governed by equation 2 where the noise directivity is assumed to be bipolar at 90-degree azimuth θ:

$$dBm_e(r, \theta) = \\ dBm_0 - 10.0\gamma\log_{10}\left(\frac{r}{r_0}\right) - 10\log_{10}\left(\frac{\cos\left(\frac{\cos\theta}{2}\right) - \cos\left(\frac{1}{2}\right)}{\sin\theta}\right)$$ Equation 2

Moreover, if far-field EM propagation is assumed, then its directivity is negligible. Further, since the source of the electromagnetic signal is below surface, its Euclidean distance with respect to the remote nodes is calculated as a function of both the remote nodes' coordinates as well as its depth.

Figure 3A:
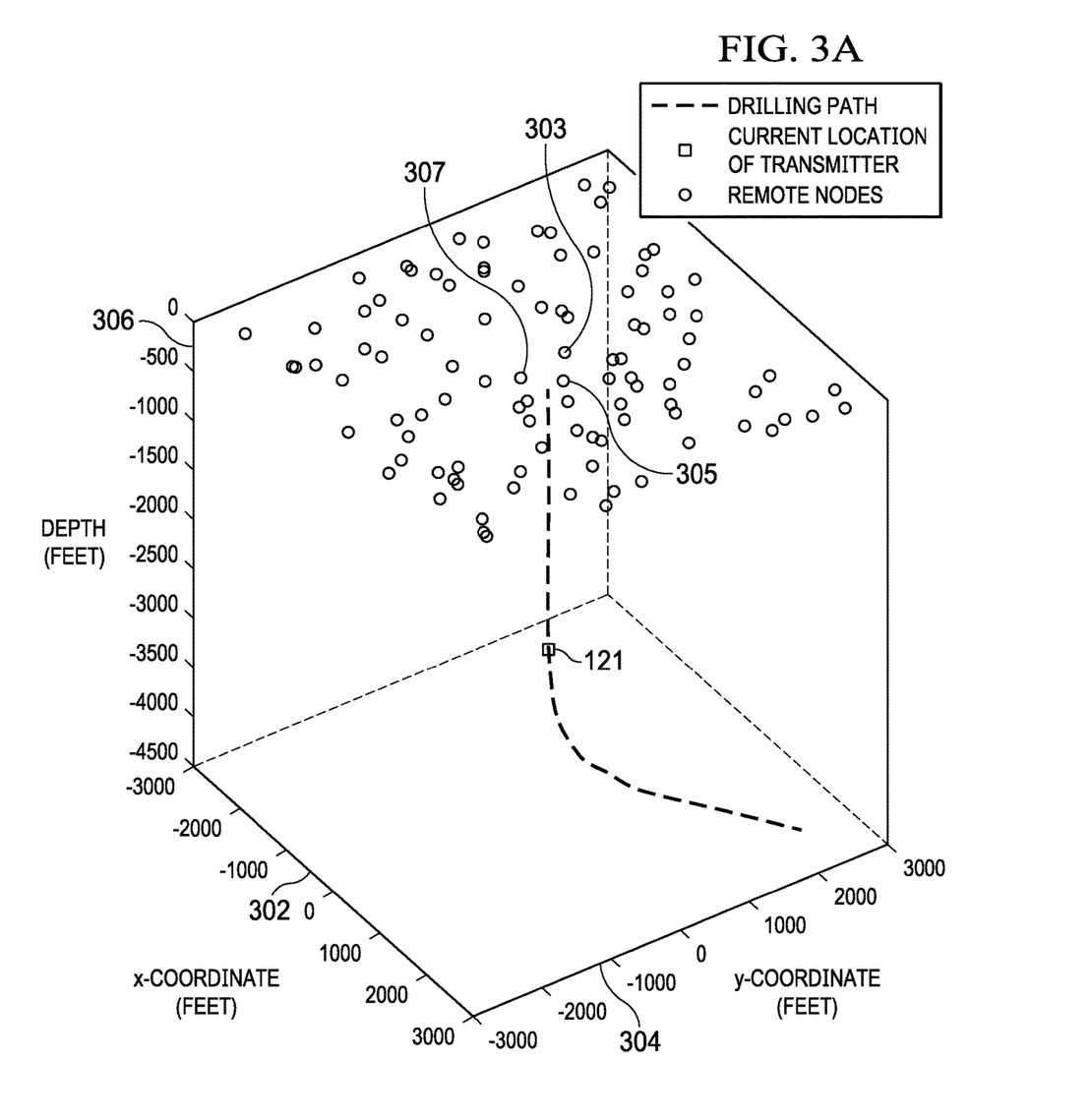
FIG. 3A is a three-dimensional plot of a drilling environment similar to the drilling environment of FIG. 2, and having a downhole transmitter positioned in a vertical section of a drill path or well path, and multiple remote nodes that are deployed in the drilling environment.
Figure 3B:
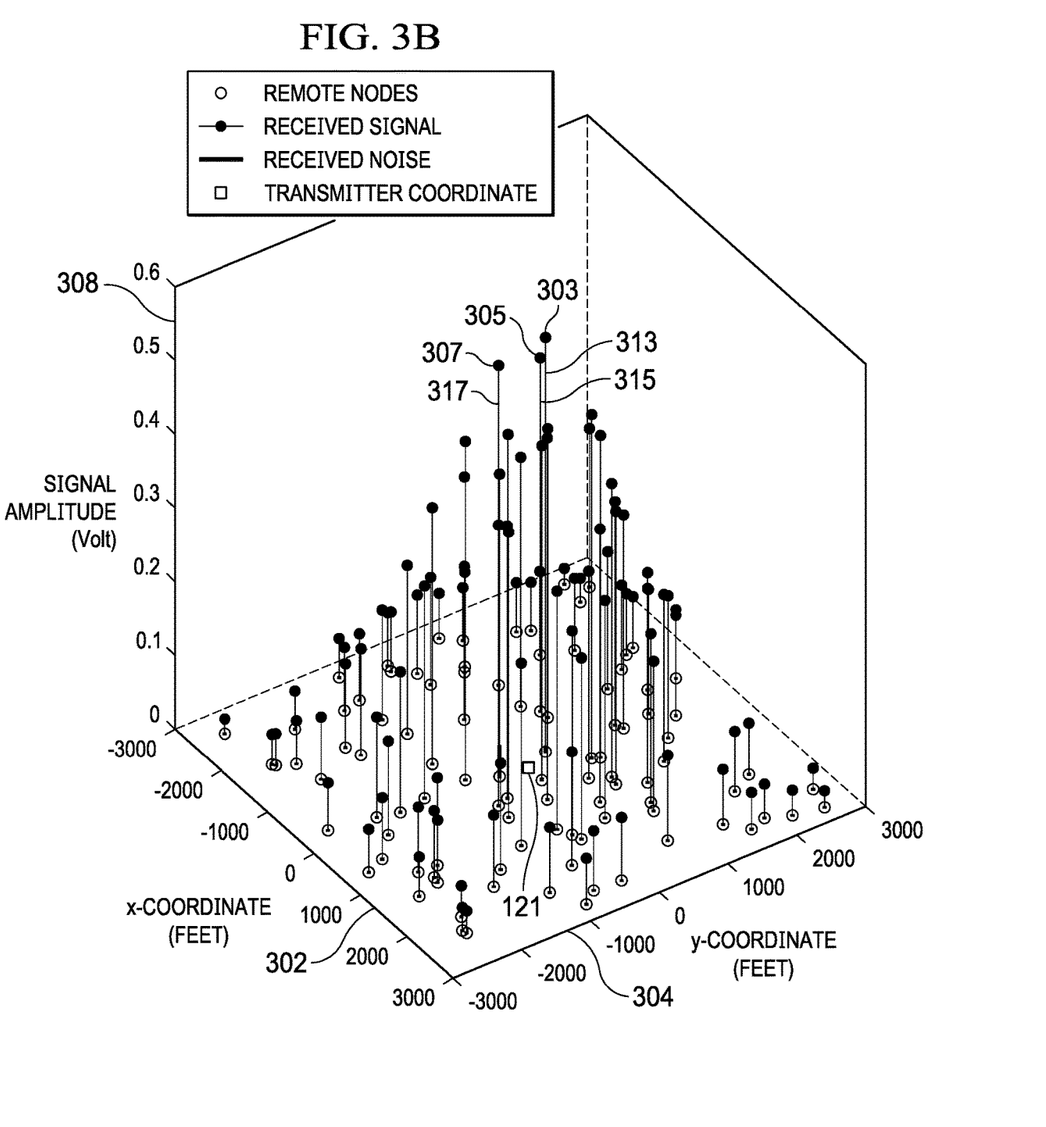
FIG. 3B is a three-dimensional histogram of the signal strength of signals transmitted from a downhole transmitter and detected by the remote nodes of FIG. 3A while the downhole transmitter is positioned in the vertical section of the drill path or well path as shown in FIG. 3A.

FIG. 3A is a three-dimensional plot of a drilling environment similar to the drilling environment of FIG. 2, and having a downhole transmitter 121 positioned in a vertical section of a drill path or well path. In the embodiment of FIG. 3A, multiple remote nodes, including remote nodes 303, 305, and 307 are deployed in the drilling environment. FIG. 3B is a three-dimensional histogram of the signal strength of signals transmitted from downhole transmitter 121 and detected by the remote nodes of FIG. 3A while downhole transmitter 121 is positioned in the vertical section of the drill path or well path. In the embodiment of FIG. 3A, axis 302 represents an x-axis, axis 304 represents a y-axis, and axis 306 represents a z-axis of the three-dimensional plot, whereas in the embodiment of FIG. 3B, axis 302 represents the x-axis, axis 304 represents the y-axis, and axis 308 represents the signal amplitude of signals of downhole transmitter 121 at a remote node.

In the embodiments of FIGS. 3A and 3B, the current location of downhole transmitter 121 is approximately at 3000 feet depth. From the distribution of the signal level over the deployed remote nodes, remote nodes 303, 305, and 307, which are positioned around the location of downhole transmitter 121 (or within a threshold distance of downhole transmitter 121), receive higher signal levels (or above a threshold signal level) compared to other remote nodes that are located further away from downhole transmitter 121. This is indicated by the amplitudes of lines 313, 315, and 317 in axis 308. In one or more of such embodiments, remote nodes that are positioned around the location of downhole transmitter 121 (or within a threshold distance of the downhole transmitter 121) also receive higher signal levels. However, as downhole transmitter 121 moves away from the vertical path and located along the lateral path, the signal level drops near the surface rig (at coordinate (0,0) foot) while the noise level (assuming no change to the noise source) is higher than the signal level.

Figure 4A:
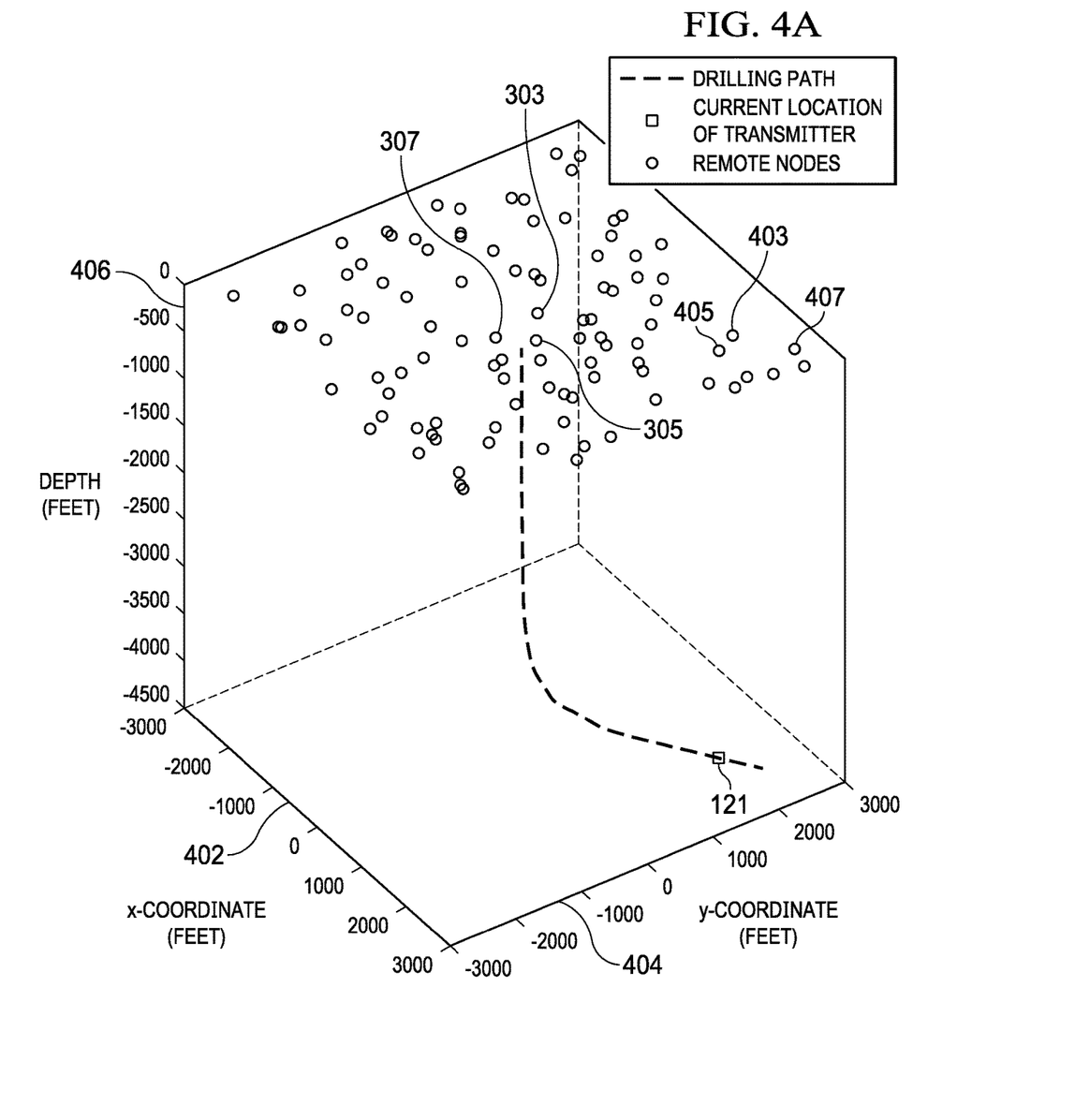
FIG. 4A is a three-dimensional plot of the drilling environment of FIG. 3A, where the downhole transmitter of FIG. 3A is positioned in a horizontal section of a drill path or well path.
Figure 4B:
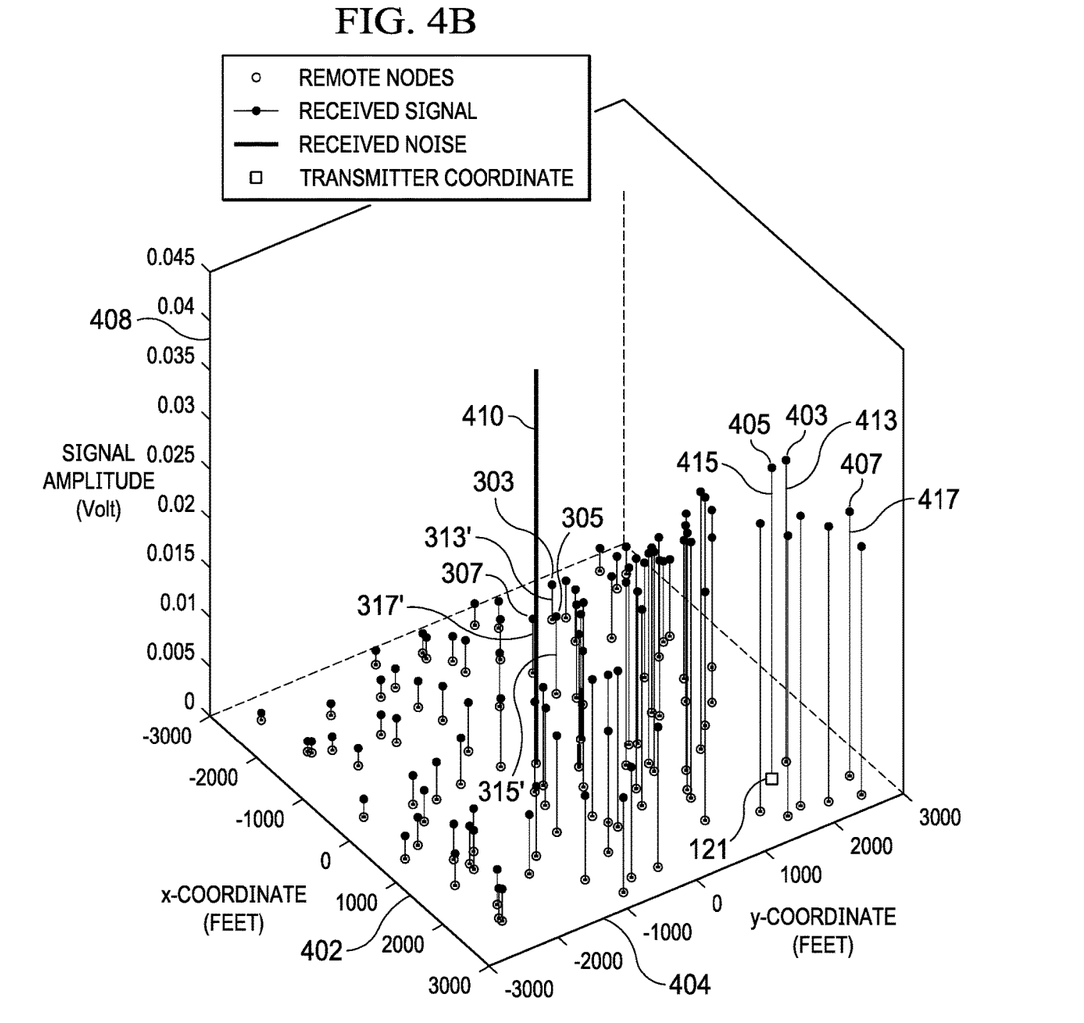
FIG. 4B is a three-dimensional histogram of the signal strength of signals transmitted from a downhole transmitter and detected by the remote nodes of FIG. 4A while the downhole transmitter is positioned in the horizontal section of the drill path or well path as shown in FIG. 4A.

In that regard, FIG. 4A is a three-dimensional plot of the drilling environment of FIG. 4A, where downhole transmitter 121 of FIG. 3A is positioned in a horizontal section of the drill path or well path. Further, FIG. 4B is a three-dimensional histogram of the signal strength of signals transmitted from downhole transmitter 121 and detected by the remote nodes of FIG. 4A while downhole transmitter 121 is positioned in the horizontal section of the drill path or well path. In the embodiment of FIGS. 4A and 4B, the remote nodes include remote nodes 303, 305, and 307, which are positioned near the surface rig (at coordinate (0,0) foot), and remote nodes 403, 405, and 407, which are positioned near the current location of downhole transmitter 121. Further, in the embodiment of FIG. 4A, axis 402 represents an x-axis, axis 404 represents a y-axis, and axis 406 represents a z-axis of the three-dimensional plot, whereas in the embodiment of FIG. 4B, axis 402 represents the x-axis, axis 404 represents the y-axis, and axis 408 represents the signal amplitude of signals of downhole transmitter 121 at a remote node. As shown in FIG. 4B, the signal strength at nodes 303, 305, and 307, which are illustrated by the amplitudes of lines 313', 315', and 317', have decreased (e.g., below a threshold of 0.025 volt) as downhole transmitter moves further away from the surface rig, and the strength of the noise, as illustrated by the amplitude of line 410 becomes more pronounced. However, the signal strength at remote nodes 403, 405, and 407, which are illustrated by the amplitudes of lines 413, 415, and 417, have increased (e.g., above the threshold of 0.025 volt) as downhole transmitter moves closer to the locations of remote nodes 403, 405, and 407. In some embodiments, a drilling data acquisition system, such as drilling data acquisition system 184 of FIG. 1, approximates the current location of the downhole transmitter based on the signal strengths of the remote nodes, requests remote nodes that detect a signal strength above a threshold to operate in acquisition mode while requesting other remote nodes that do not detect a signal strength above the threshold to operate in the survey mode. Further, the drilling data acquisition system also requests different remote nodes to switch between acquisition mode and survey mode as the downhole transmitter traverses downhole.

Figure 5:
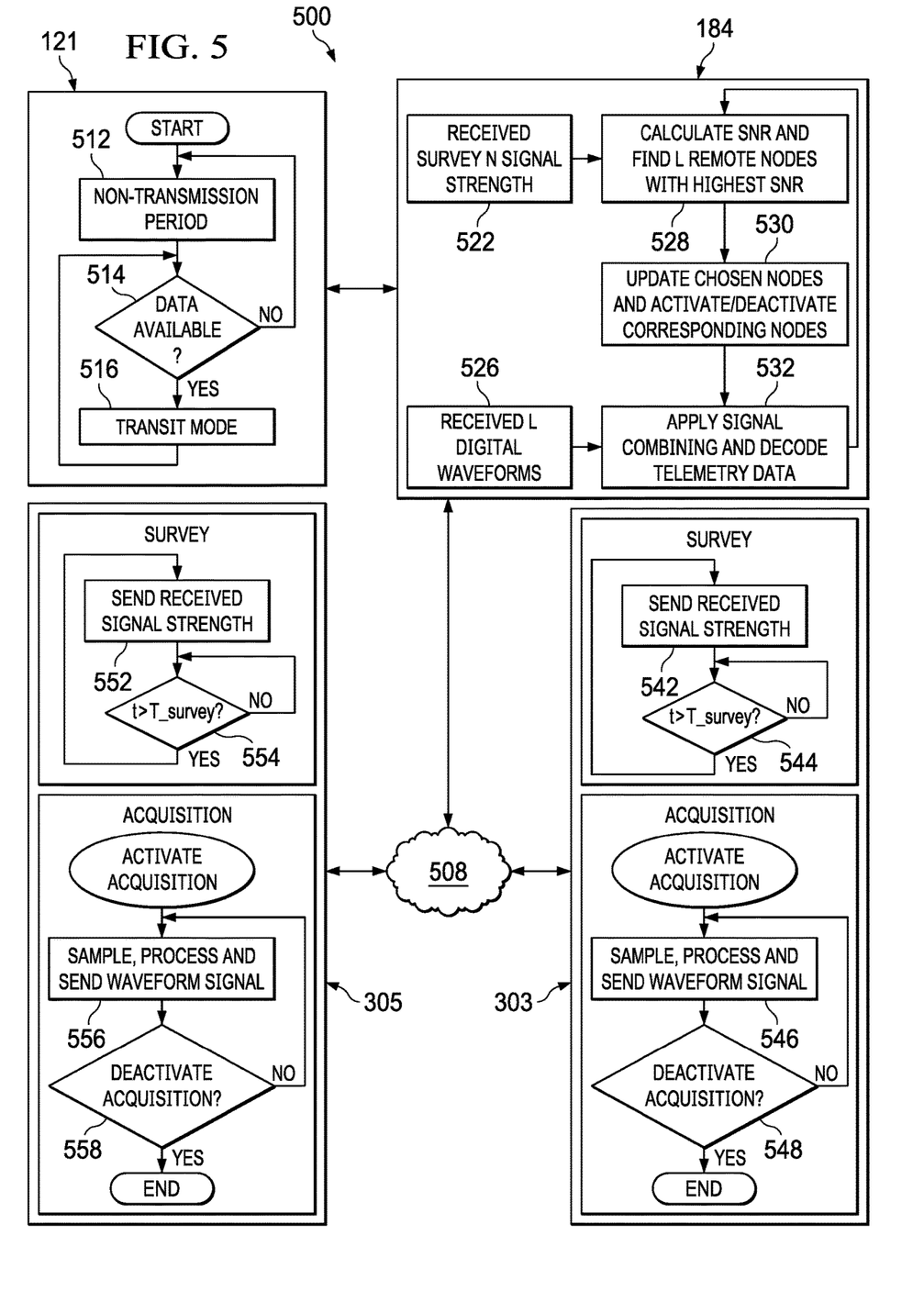
FIG. 5 is a block diagram of an electromagnetic telemetry system.

FIG. 5 is a block diagram of a drilling data acquisition system 500. At block 512, transmitter 121 operates in non-transmission mode. At block 514, a determination of whether drilling data is available is made. This process returns to block 512 if no new drilling data is available. Alternatively, the process proceeds to block 516 if drilling data is available, and downhole transmitter 121 transmits the available drilling data. In the embodiment of FIG. 5, downhole transmitter 121 also provides (e.g., via telemetry or via wireless network 508) drilling data acquisition system 184 an indication that downhole transmitter 121 is operating in transmission mode or will operate in transmission mode.

At block 522, drilling data acquisition system 184 periodically receives signal strength of the remote nodes (e.g., N number of total nodes), including remote nodes 303 and 305. After drilling data acquisition system 184 receives an indication from downhole transmitter 121 that downhole transmitter 121 is operating in or will switch to transmission mode, drilling data acquisition system 184 proceeds to block 628, calculates a signal strength or SNR of each remote node of the N remote nodes, and determines one or more remote nodes (e.g., L number of remote nodes) with the highest signal strength or SNR (or above a threshold level). Drilling data acquisition system 184 then proceeds to block 530, and requests certain remote nodes (e.g., L number of remote nodes) with the highest signal strength or SNR (or above the threshold level) to operate in acquisition mode, and requests the other remote nodes (e.g., remote nodes with signal strength or SNR not above the threshold level) to operate in survey mode. In the embodiment of FIG. 5, drilling data acquisition system 184 also updates its data on the current mode of each remote node. At block 526, drilling data acquisition system 184 receives signals and waveforms from the L number of remote nodes, such as remote nodes 303 and 305. Drilling data acquisition system 184 then proceeds to block 532, where drilling data acquisition system 184 performs one or more operations to combine signals of the drilling data received from multiple remote nodes and decode the received data. In some embodiments, drilling data acquisition system 184 also performs noise reduction or noise cancellation operations to reduce or cancel a noise component of the received signals.

In the embodiment of FIG. 5, electromagnetic telemetry system 500 also includes remote nodes 303 and 305. Each of remote nodes 303 and 305 is configured to alternatively operate in survey mode or acquisition mode. While remote nodes 303 and 305 are in survey mode, remote nodes 303 and 305 at blocks 542 and 552, respectively, periodically transmit signal strength of downhole transmitter 121 at remote nodes 303 and 305, respectively, to drilling data acquisition system 184. At blocks 544 and 554, respectively, remote nodes 303 and 305 determine if a threshold period of time (e.g., 10 minutes, 1 hour, or another period of time) since the last time the signal strength of downhole transmitter 121 was transmitted to drilling data acquisition system 184 has passed. The process returns to blocks 542 and 552, respectively if the threshold period of time has passed and remote nodes 303 and 305 each transmits a new signal strength of downhole transmitter 121. While remote nodes 303 and 305 are in acquisition mode, remote nodes 303 and 305 at blocks 546 and 556, respectively, perform operations including sampling, processing, and transmitting drilling data obtained from downhole transmitter 121 to drilling data acquisition system 184. At blocks 548 and 558, respectively, remote nodes 303 and 305 determine whether to switch from acquisition mode to survey mode. In some embodiments, remote nodes determine to switch to survey mode in response to a request from drilling data acquisition system 184 to switch to survey mode.

Figure 6:
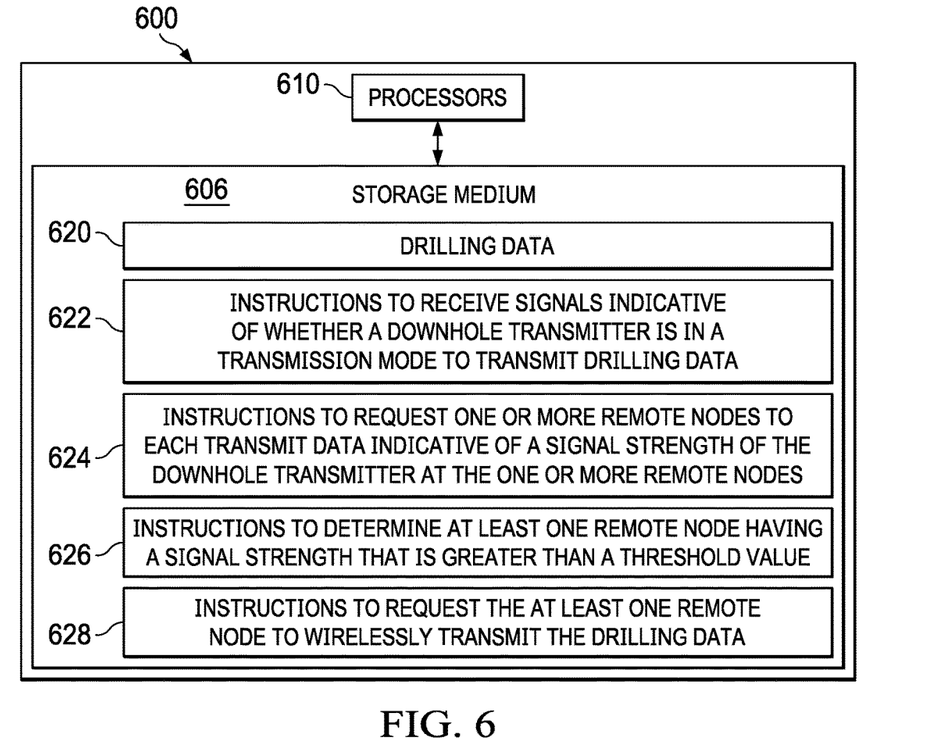
FIG. 6 is a block diagram of a drilling data acquisition system.

FIG. 6 is a block diagram of a drilling data acquisition system 600. Drilling data acquisition system 600 includes a storage medium 606 and processors 610. Storage medium 606 may be formed from data storage components such as, but not limited to, read-only memory (ROM), random access memory (RAM), flash memory, magnetic hard drives, solid-state hard drives, CD-ROM drives, DVD drives, floppy disk drives, as well as other types of data storage components and devices. In some embodiments, storage medium 606 includes multiple data storage devices.

In further embodiments, the multiple data storage devices may be physically stored at different locations. Drilling data are stored at a first location 620 of storage medium 606. As shown in FIG. 6, instructions to receive signals indicative of whether the downhole transmitter is in transmission mode to transmit drilling data of a drilling operation at a hydrocarbon wellbore are stored at a second location 622 of storage medium 606, instructions to request one or more remote nodes to each transmit data indicative of a signal strength of the downhole transmitter at the one or more remote nodes are stored at a third location 624 of the storage medium 606, instructions to determine at least one remote node having a signal strength that is greater than a threshold value are stored at a fourth location 626 of storage medium 606, and instructions to request the at least one remote node to wirelessly transmit the drilling data are stored at a fifth location 528 of storage medium 606. The instructions to perform other operations described herein are also stored in storage medium 606.

Figure 7:
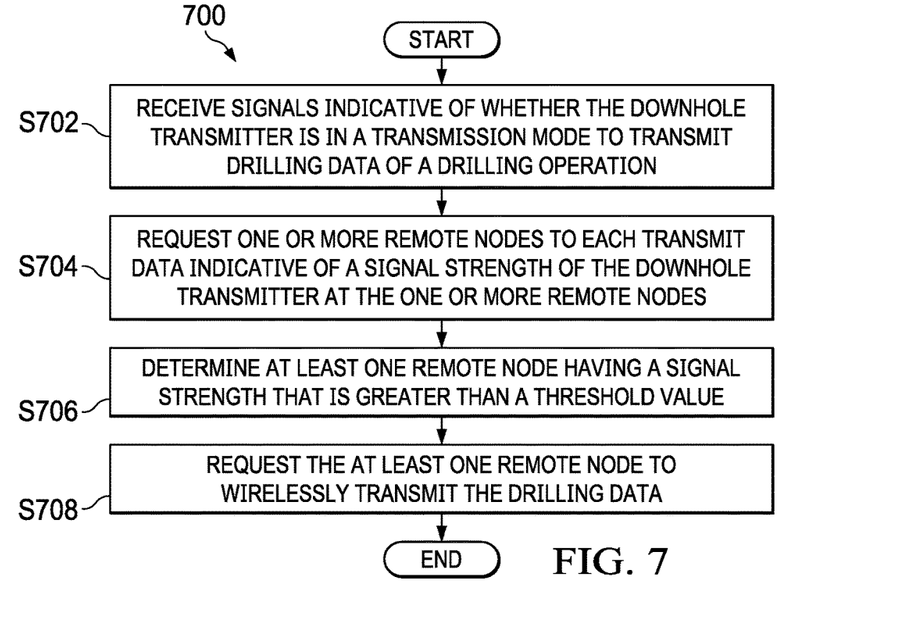
FIG. 7 is a flow chart of a process to obtain downhole signals indicative of a drilling operation.

FIG. 7 is a flow chart of a process 700 to obtain downhole signals indicative of a drilling operation. Although the operations in the process 700 are shown in a particular sequence, certain operations may be performed in different sequences or at the same time where feasible. Further, although the operations in process 700 are described to be performed by processors 610 of drilling data acquisition system 600 of FIG. 6, the operations may also be performed by one or more processors of other electronic devices operable to perform operations described herein.

At block S702, signals indicative of whether a downhole transmitter is in transmission mode to transmit drilling data of a drilling operation at a hydrocarbon wellbore are received by the drilling data acquisition system. Drilling data acquisition system 184 of FIG. 1, for example, is configured to receive signals from downhole transmitter 121 indicating whether downhole transmitter 121 is operating in transmission mode. In some embodiments, the signals are acknowledgement signals transmitted via conveyance 119 of FIG. 1. At block S704, a request for one or more remote nodes disposed around the hydrocarbon wellsite to transmit data indicative of a signal strength of the downhole transmitter at the one or more remote nodes is made. Drilling data acquisition system 184, for example, after receiving an indication that downhole transmitter 121 is in or will be in transmission mode within a threshold period of time, requests remote nodes 161-166 to transmit data indicative of the signal strength of downhole transmitter 121 at the respective remote nodes 161-166. At block S706, at least one remote node having a signal strength that is greater than a threshold value is determined. For example, while downhole transmitter 121 is deployed in the vertical section of the drill path shown in FIG. 3A, drilling data acquisition system 184 analyzes the signal strength of downhole transmitter 121 at the remote nodes illustrated in FIG. 3A, and determines that the signal strength of downhole transmitter 121 at remote nodes 303, 305, and 307 of FIGS. 3A and 3B is greater than the threshold signal strength (0.5 volt or another threshold signal strength). At block S708, the at least one remote node is requested to wirelessly transmit the drilling data. Continuing with the foregoing example, after drilling data acquisition system 184 determines that the signal strength of downhole transmitter 121 at remote nodes 303, 305, and 307 is greater than the threshold signal strength, drilling data acquisition system 184 requests remote nodes 303, 305, and 307 to switch to or continue acquisition mode, obtain drilling data transmitted by downhole transmitter 121, and wirelessly transmit the acquired drilling data to data acquisition system 184.

In some embodiments, the drilling data acquisition system also performs signal combination operations, such as beam forming operations, to combine the signals of the drilling data that are transmitted from multiple remote nodes to improve signal strength, and/or to reduce the noise component of the signals. In some embodiments, the drilling data acquisition system periodically requests the remote nodes to operate in survey mode or acquisition mode, or switch between survey mode and acquisition mode based on the signal strength or the SNR of downhole transmitter at the respective remote nodes. In one or more of such embodiments, the drilling data acquisition system requests all remote nodes that detect transmissions from the downhole transmitter at a threshold signal strength or SNR to operate in or switch to acquisition mode, and requests all remote nodes that do not detect transmission from the downhole transmitter at the threshold signal strength or SNR to operate in or switch to survey mode.

In some embodiments, the drilling data acquisition system periodically determines an expected location of the downhole transmitter. For example, in the embodiment of FIGS. 3A and 4A, downhole transmitter 121 traverses from a location in a vertical section of the drill path shown in FIG. 3A to another location in the horizontal section of the drill path shown in FIG. 4A. In one or more of such embodiments, the drilling data acquisition system periodically determines the expected location of the downhole transmitter based on a planned well path. In one or more of such embodiments, the drilling data acquisition system requests remote nodes that are within a threshold distance of a current excepted position of the downhole transmitter to operate in or switch to acquisition mode, and requests other remote nodes that are not within the threshold distance of the current expected position of the downhole transmitter to operate in or switch to survey mode. In some embodiments, the drilling data acquisition system, such as drilling data acquisition system 184 of FIG. 1, periodically determines an actual location of a downhole transmitter, such as based on the signal strength or SNR of signals of downhole transmitter at different remote nodes deployed at the wellsite. In one or more of such embodiments, the drilling data acquisition system also determines whether the downhole transmitter has deviated from the expected location or path based on the signal strength or SNRS of the downhole transmitter at the respective nodes. Further, the drilling data acquisition system dynamically requests remote nodes that are within a threshold distance of the actual location of the downhole transmitter to operate in or switch to acquisition mode, and requests other remote nodes that are not within the threshold distance of the actual location of the downhole transmitter to operate in or switch to survey mode.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, an electromagnetic telemetry system, comprising: a downhole transmitter configured to transmit signals indicative of whether the downhole transmitter is in a transmission mode to transmit drilling data of a drilling operation at a hydrocarbon wellsite; a drilling data acquisition system configured to receive the signals indicative of whether the downhole transmitter is in the transmission mode; and one or more remote nodes disposed around a hydrocarbon wellsite, each respective remote node of the one or more remote nodes configured to perform operations comprising: operate in a first mode comprising the operations of: periodically transmit data indicative of a signal strength of the downhole transmitter at the respective remote node to the drilling data acquisition system; and in response to a request by the drilling data acquisition system, operate in a second mode comprising the operations of: acquire the drilling data from the downhole transmitter; and wirelessly transmit the drilling data acquired from the downhole transmitter to the drilling data acquisition system.

Clause 2, the electromagnetic telemetry system of clause 1, wherein the drilling data acquisition system is further configured to periodically request at least one of the one or more remote nodes to switch between operating in the first mode and the second mode.

Clause 3, the electromagnetic telemetry system of clause 2, wherein the drilling data acquisition system is further configured to perform operations comprising: determine a signal strength of the downhole transmitter at a first remote node and a second remote node of the one or more remote nodes; in response to a determination that the signal strength of the downhole transmitter at the first remote node is greater than a threshold signal strength, request the first remote node to operate in the second mode; and in response to a determination that the signal strength of the downhole transmitter at the second remote node is not greater than the threshold signal strength, request the second remote node to operate in the first mode.

Clause 4, the electromagnetic telemetry system of clause 2, wherein the drilling data acquisition system is further configured to perform operations comprising: determine a signal strength of the downhole transmitter at a first remote node and a second remote node of the one or more remote nodes; and in response to a determination that the signal strength of the downhole transmitter at the first remote node and the second remote node are greater than a threshold signal strength, request the first remote node and the second remote node to operate in the second mode.

Clause 5, the electromagnetic telemetry system of clause 4, wherein the drilling data acquisition system is further configured to combine signals of the drilling data transmitted from the first remote node with the signals of the drilling data transmitted from the second remote node.

Clause 6, the electromagnetic telemetry system of clause 5, wherein the drilling data acquisition system is further configured to perform a signal combination operation to improve a signal to noise ratio of the signals of the drilling data.

Clause 7, the electromagnetic telemetry system of any of clauses 1-6, wherein the drilling data acquisition system is further configured to perform a noise reduction operation to reduce a noise component of signals of the drilling data.

Clause 8, the electromagnetic telemetry system of any of clauses 1-7, wherein the drilling data acquisition system is further configured to perform operations comprising: determine an expected location of the downhole transmitter; and request a remote node of the one or more remote nodes located within a threshold distance from the downhole transmitter to operate in the second mode.

Clause 9, the electromagnetic telemetry system of clause 8, wherein the drilling data acquisition system is further configured to perform operations comprising: periodically determine the expected location of the downhole transmitter; and in response to a determination that the remote node is not within the threshold distance from the downhole transmitter, request the remote node to operate in the first mode.

Clause 10, the electromagnetic telemetry system of any of clauses 1-9, wherein the drilling data acquisition system is further configured to decode signals of the drilling data.

Clause 11, the electromagnetic telemetry system of any of clauses 1-10, wherein the drilling data acquisition system is further configured to determine, based on signals of the drilling data received from the one or more remote nodes, a well path of a wellbore formed during the drilling operation.

Clause 12, the electromagnetic telemetry system of any of clauses 1-11, wherein the remote nodes are disposed along a surface of the hydrocarbon wellsite.

Clause 13, a computer-implemented method to obtain signals indicative of a drilling operation, comprising: receiving, from a downhole transmitter, signals indicative of whether the downhole transmitter is in a transmission mode to transmit drilling data of a drilling operation at a hydrocarbon wellbore; requesting one or more remote nodes disposed around the hydrocarbon wellsite to each transmit data indicative of a signal strength of the downhole transmitter at the one or more remote nodes; determining at least one remote node having a signal strength that is greater than a threshold value; and requesting the at least one remote node to wirelessly transmit the drilling data.

Clause 14, the computer-implemented method of clause 13, further comprising: determining a signal strength of the downhole transmitter at a first remote node and a second remote node of the one or more remote nodes; in response to a determination that the signal strength of the downhole transmitter at the first remote node is not greater than a threshold signal strength, requesting the first remote node to operate in a first mode; and in response to a determination that the signal strength of the downhole transmitter at the second remote node is greater than the threshold signal strength, requesting the second remote node to operate in a second mode.

Clause 15, the computer-implemented method of clause 14, further comprising: in response to a determination that the signal strength of the downhole transmitter at the first remote node and the second remote node are greater than the threshold signal strength, requesting the first remote node and the second remote node to operate in the second mode.

Clause 16, the computer-implemented method of clause 15, further comprising combining signals of the drilling data transmitted from the first remote node and the signals of the drilling data transmitted from the second remote node to improve a signal to noise ratio of the signals of the drilling data.

Clause 17, the computer-implemented method of any of clauses 13-16, further comprising performing a noise reduction operation to reduce a noise component of the signals of the drilling data.

Clause 18, the computer-implemented method of any of clauses 13-17, further comprising: determining an expected location of the downhole transmitter; requesting a first remote node of the one or more remote nodes that is not located within a threshold distance from the expected location of the downhole transmitter to operate in a first mode; and requesting a second remote node of the one or more remote nodes that is located within the threshold distance from the expected location of the downhole transmitter to operate in a second mode.

Clause 19, a drilling data processing system comprising: a storage medium; and one or more processors configured to: receive, from a downhole transmitter, signals indicative of whether the downhole transmitter is in a transmission mode to transmit drilling data of a drilling operation at a hydrocarbon wellbore; request one or more remote nodes disposed around the hydrocarbon wellsite to each transmit data indicative of a signal strength of the downhole transmitter at the one or more remote nodes; determine at least one remote node having a signal strength that is greater than a threshold value; and request the at least one remote node to wirelessly transmit the drilling data.

Clause 20, the drilling data processing system of clause 19, wherein the one or more processors are further configured to: determine a signal strength of the downhole transmitter at a first remote node and a second remote node of the one or more remote nodes; in response to a determination that the signal strength of the downhole transmitter at the first remote node is not greater than a threshold signal strength, request the first remote node to operate in a first mode; and in response to a determination that the signal strength of the downhole transmitter at the second remote node is greater than the threshold signal strength, request the second remote node to operate in a second mode.

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. An electromagnetic telemetry system, comprising:
   a downhole transmitter configured to transmit signals indicative of whether the downhole transmitter is in a transmission mode to transmit drilling data of a drilling operation at a hydrocarbon wellsite;
   a drilling data acquisition system configured to receive the signals indicative of whether the downhole transmitter is in the transmission mode; and
   one or more remote nodes disposed around a hydrocarbon wellsite, each respective remote node of the one or more remote nodes configured to perform operations comprising:
   operate in a first mode comprising the operations of:
      periodically transmit data indicative of a signal strength of the downhole transmitter at the respective remote node to the drilling data acquisition system; and
   in response to a request by the drilling data acquisition system, operate in a second mode comprising the operations of:
      acquire the drilling data from the downhole transmitter; and
      wirelessly transmit the drilling data acquired from the downhole transmitter to the drilling data acquisition system.

2. The electromagnetic telemetry system of claim 1, wherein the drilling data acquisition system is further configured to periodically request at least one of the one or more remote nodes to switch between operating in the first mode and the second mode.

3. The electromagnetic telemetry system of claim 2, wherein the drilling data acquisition system is further configured to perform operations comprising:
   determine a signal strength of the downhole transmitter at a first remote node and a second remote node of the one or more remote nodes;
   in response to a determination that the signal strength of the downhole transmitter at the first remote node is greater than a threshold signal strength, request the first remote node to operate in the second mode; and
   in response to a determination that the signal strength of the downhole transmitter at the second remote node is not greater than the threshold signal strength, request the second remote node to operate in the first mode.

4. The electromagnetic telemetry system of claim 2, wherein the drilling data acquisition system is further configured to perform operations comprising:
   determine a signal strength of the downhole transmitter at a first remote node and a second remote node of the one or more remote nodes; and
   in response to a determination that the signal strength of the downhole transmitter at the first remote node and the second remote node are greater than a threshold signal strength, request the first remote node and the second remote node to operate in the second mode.

5. The electromagnetic telemetry system of claim 4, wherein the drilling data acquisition system is further configured to combine signals of the drilling data transmitted from the first remote node with the signals of the drilling data transmitted from the second remote node.

6. The electromagnetic telemetry system of claim 5, wherein the drilling data acquisition system is further configured to perform a signal combination operation to improve a signal-to-noise ratio of the signals of the drilling data.

7. The electromagnetic telemetry system of claim 1, wherein the drilling data acquisition system is further configured to perform a noise reduction operation to reduce a noise component of signals of the drilling data.

8. The electromagnetic telemetry system of claim 1, wherein the drilling data acquisition system is further configured to perform operations comprising:
   determine an expected location of the downhole transmitter; and
   request a remote node of the one or more remote nodes located within a threshold distance from the downhole transmitter to operate in the second mode.

9. The electromagnetic telemetry system of claim 8, wherein the drilling data acquisition system is further configured to perform operations comprising:
   periodically determine the expected location of the downhole transmitter; and
   in response to a determination that the remote node is not within the threshold distance from the downhole transmitter, request the remote node to operate in the first mode.

10. The electromagnetic telemetry system of claim 1, wherein the drilling data acquisition system is further configured to decode signals of the drilling data.

11. The electromagnetic telemetry system of claim 1, wherein the drilling data acquisition system is further configured to determine, based on signals of the drilling data received from the one or more remote nodes, a well path of a wellbore formed during the drilling operation.

12. The electromagnetic telemetry system of claim 1, wherein the remote nodes are disposed along a surface of the hydrocarbon well site.

13. A computer-implemented method to obtain signals indicative of a drilling operation, comprising:
   receiving, from a downhole transmitter, signals indicative of whether the downhole transmitter is in a transmission mode to transmit drilling data of a drilling operation at a hydrocarbon wellbore;
   requesting one or more remote nodes disposed around the hydrocarbon wellsite to each transmit data indicative of a signal strength of the downhole transmitter at the one or more remote nodes;
   determining at least one remote node having a signal strength that is greater than a threshold value; and
   requesting the at least one remote node to wirelessly transmit the drilling data.

14. The computer-implemented method of claim 13, further comprising:
   determining a signal strength of the downhole transmitter at a first remote node and a second remote node of the one or more remote nodes;
   in response to a determination that the signal strength of the downhole transmitter at the first remote node is not greater than a threshold signal strength, requesting the first remote node to operate in a first mode; and
   in response to a determination that the signal strength of the downhole transmitter at the second remote node is greater than the threshold signal strength, requesting the second remote node to operate in a second mode.

15. The computer-implemented method of claim 14, further comprising:
   in response to a determination that the signal strength of the downhole transmitter at the first remote node and the second remote node are greater than the threshold signal strength, requesting the first remote node and the second remote node to operate in the second mode.

16. The computer-implemented method of claim 15, further comprising combining signals of the drilling data transmitted from the first remote node and the signals of the drilling data transmitted from the second remote node to improve a signal-to-noise ratio of the signals of the drilling data.

17. The computer-implemented method of claim 13, further comprising performing a noise reduction operation to reduce a noise component of the signals of the drilling data.

18. The computer-implemented method of claim 13, further comprising:
   determining an expected location of the downhole transmitter;
   requesting a first remote node of the one or more remote nodes that is not located within a threshold distance from the expected location of the downhole transmitter to operate in a first mode; and
   requesting a second remote node of the one or more remote nodes that is located within the threshold distance from the expected location of the downhole transmitter to operate in a second mode.

19. A drilling data processing system comprising:
   a storage medium; and
   one or more processors configured to:
      receive, from a downhole transmitter, signals indicative of whether the downhole transmitter is in a transmission mode to transmit drilling data of a drilling operation at a hydrocarbon wellbore;
      request one or more remote nodes disposed around the hydrocarbon wellsite to each transmit data indicative of a signal strength of the downhole transmitter at the one or more remote nodes;
      determine at least one remote node having a signal strength that is greater than a threshold value; and
      request the at least one remote node to wirelessly transmit the drilling data.

20. The drilling data processing system of claim 19, wherein the one or more processors are further configured to:
   determine a signal strength of the downhole transmitter at a first remote node and a second remote node of the one or more remote nodes;
   in response to a determination that the signal strength of the downhole transmitter at the first remote node is not greater than a threshold signal strength, request the first remote node to operate in a first mode; and
   in response to a determination that the signal strength of the downhole transmitter at the second remote node is greater than the threshold signal strength, request the second remote node to operate in a second mode.

* * * * *